United States Patent [19]

Dominey

[11] 4,049,560

[45] Sept. 20, 1977

[54] DETERGENT ADDITIVES

[75] Inventor: Alan Michael Dominey, Oxford, England

[73] Assignee: Exxon Research & Engineering Co., Linden, N.J.

[21] Appl. No.: 590,852

[22] Filed: June 27, 1975

[30] Foreign Application Priority Data

July 5, 1974 United Kingdom ............... 29969/74

[51] Int. Cl.² .............................................. C10M 1/40
[52] U.S. Cl. .................................... 252/33.3; 252/18; 252/25; 252/33.2; 252/42.7
[58] Field of Search .................... 252/33.3, 33.2, 42.7, 252/18, 25

[56] References Cited

U.S. PATENT DOCUMENTS

| | | | |
|---|---|---|---|
| 3,388,063 | 6/1968 | Allphin | 252/42.7 X |
| 3,493,516 | 2/1970 | Allphin et al. | 252/33.3 |
| 3,609,076 | 9/1971 | Sabol et al. | 252/18 X |
| 3,629,109 | 12/1971 | Gergel et al. | 252/33.2 X |
| 3,671,430 | 6/1972 | Corringer | 252/33.3 X |

Primary Examiner—Patrick P. Garvin
Attorney, Agent, or Firm—Frank T. Johmann

[57] ABSTRACT

Producing an overbased magnesium phenate detergent by carbonating a mixture of a sulphur containing phenol, a smaller amount of a sulphonic acid, sulphonate or sulphate, an alkanol, magnesium oxide or hydroxide and a carboxylic acid, anhydride or salt.

16 Claims, No Drawings

DETERGENT ADDITIVES

This invention relates to highly basic detergent additives and a process for making them.

This invention is concerned with overbased magnesium detergents comprising overbased magnesium phenates, that is magnesium phenates which contain an amount of magnesium which is in excess of stoicheiometric compared with the phenate anion. Such overbased magnesium detergents are found to be not only good detergents, e.g. in lubricating oils, but also show good antioxidant and good anti-rust properties.

According to this invention an overbased magnesium detergent is prepared by a process in which carbon dioxide is introduced into a reaction mixture which comprises a. 15-40 wt.% of a sulphurised phenol or thiophenol containing one or more hydrocarbyl substituents, or a phenol or thiophenol containing one or more hydrocarbyl substituents, or said phenol or thiophenol containing one or more hydrocarbyl substituents together with sulphur.

b. 5-15 wt.% of an organic sulphonic acid, an organic sulphonate or an organic sulphate, c. 5-15 wt.% of a glycol, a $C_1$ to $C_5$ monohydric alkanol or a $C_2$ to $C_6$ alkoxy alkanol, d. 2-15 wt.% of a magnesium hydroxide or active magnesium oxide, e. At least 0.1 wt.% of a $C_1$ to $C_{18}$ carboxylic acid, an anhydride thereof, or an ammonium, an amine salt, a Group 1 metal or a Group II metal salt of said $C_1$ to $C_{18}$ carboxylic acid, and f. At least 10% by weight of a diluent oil (including any present in components (a) and (b)).

Optionally one may also have (g) 10-35 wt.% of an aromatic or an alphatic hydrocarbon solvent.

We prefer to use 15-30% by weight of component (a) which is preferably a sulphurised phenol and these may have the structure

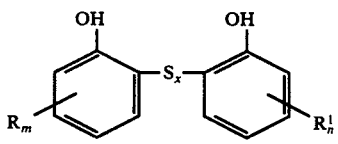

where R and $R^1$ are hydrocarbyl groups, $m$ and $n$ are zero or integers of 1 to 4 provided $m$ and $n$ are not both zero and $x$ is 1,2,3 or 4.

The hydrocarbyl group in the sulphurised phenol preferably has from 6 to 60 carbon atoms. Although the hydrocarbyl group can be an alkenyl, alkinyl, aryl, aralkyl or alkaryl group, it is preferred that it should be an alkyl group, and especially one containing 9 to 15 carbon atoms, e.g. nonyl, decyl, dodecyl or tetradecyl. Non-alkyl substituents which could be used include dodecenyl, tetradecenyl, phenylethyl and benzyl.

It is preferred that each benzene ring be substituted with first one hydrocarbyl group, usually in the para position, but if desired there may be more than one hydrocarbyl substituent. The sulphurised phenol may have other substituents, e.g. halogens such as chlorine or bromine, nitro or sulphonic acid groups.

Instead of a sulphurised phenol one may use a phenol containing one or more hydrocarbyl substituents, i.e. a non-sulphurised phenol. They may be represented by the formula

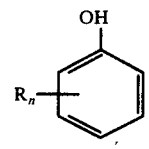

where R is a hydrocarbyl group and $n$ is 1,2,3,4 or 5. Suitable and preferred hydrocarbyl groups are as described above in connection with the sulphurised phenol. Particularly preferred hydrocarbyl groups are $C_9$ to $C_{15}$ alkyl. It is preferred that $n$ is 1 and that the substitution is in the para position, but if desired $n$ may for example be 2 or 3. Such phenols may if desired have other substituents such as a halogen.

Another alternative for component (a) is a hydrocarbyl substituted phenol together with sulphur. The sulphur which is used may be solid sulphur such as flowers of sulphur, or it may be molten sulphur and this often has cost and handling advantages. If molten sulphur is used it should be added to the reaction mixture at a temperature no higher than 110° C otherwise a very viscous product may result. When using the hydrocarbyl substituted phenol and sulphur some reaction takes place thereby forming sulphurised phenol.

Although less preferred one could use the corresponding thiophenol instead of the phenol in the three alternatives described above. In such cases the — OH group of the phenol is replaced by an — SH group.

Component (b) is an organic sulphonic acid, an organic sulphonate or an organic sulphate. Organic sulphonic acids may be natural or synthetic sulphonic acids. e.g. mahogany or petroleum alkyl sulphonic acid, an alkyl sulphonic acid or an alkaryl sulphonic acid. These sulphonic acids may be obtained by treating lubricating oil base stocks with concentrated or fuming sulphuric acid to produce oil-soluble "mahogany" acids or by sulphonating alkylated aromatic hydrocarbons. Particularly useful are the products derived from the alkylation of aromatic hydrocarbons with olefins or olefin polymers, e.g. $C_{15}-C_{30}$ polypropenes or polybutenes. The sulphonic acids can contain more than one sulphonic acid group in the molecule.

Most suitable sulphonic acids are those having a molecular weight of between 300 and 700, e.g. between 400 and 500.

The alternative component (b) is an organic sulphonate, e.g. a metal salt of one of the sulphonic acids described above. It is preferred to use a magnesium sulphonate but other metal salts, for example an alkali metal salt such as sodium or an alkaline earth metal salt such as calcium may be used. It is also possible to use ammonium sulphonates or amine sulphonates.

Although it is less preferred one can use an organic sulphate. Such sulphates may be made for example by the reaction of sulphuric acid with a cracked wax, an olefin or an alcohol. They are usually used in the form of their salts, e.g. alkali metal salts such as sodium or alkaline earth metal salts such as calcium. The olefin or alcohol from which the sulphate is derived usually has from 8 to 25 carbon atoms per molecule, and the cracked wax from 20 to 30 carbon atoms per molecule.

Component (c) is a glycol, a C1 to C5 monohydric alkanol or a $C_2$ to $C_6$ alkoxy alkanol and we prefer to use from 8 to 12% by weight of this component. Examples of suitable glycols are ethylene glycol or diethylene glycol. It is preferred to use a $C_1$ to $C_5$ alkanol and these may be for example propanol, n-butanol or n-pentanol. The especially preferred alkanol is methanol. $C_2$ to $C_6$ alkoxy alkanols which could be used include methoxyethanol, ethoxyethanol, methoxypropanol, and butoxyethanol.

Although one may use magnesium hydroxide as component (d) it is preferable if one uses active magnesium oxide and we prefer to use from 2 to 10% by weight. By active magnesium oxide we mean magnesium oxide which has a surface area of at least 80 sq. meters/gm, e.g. 100–120 sq. meters/gm.

Active magnesium oxide may be prepared by heating basic magnesium carbonate for 1–2 hours, e.g. about 3 hours, at 500°–700° e.g. about 600° C. An example of active magnesium oxide is "MAGLITE D" manufactured by Merck & Co. Inc. Another suitable method is to heat magnesium hydroxide at 350° C to 600° C until no further loss in weight occurs.

Component (e) can be regarded as a promoter and is a $C_1$ to $C_{18}$ carboxylic acid, an anhydride thereof or an ammonium or amine salt, or a Group I or II metal salt thereof. It is therefore necessary to use only that amount which acts as a promoter and although we have found that at least 0.1% by weight should be used we prefer to use an amount in the range 0.5 to 2.0% by weight. The carboxylic acid is preferably aliphatic and is preferably monocarboxylic. However aromatic or polycarboxylic acids may be used. The carboxylic acid may be saturated or unsaturated. The particularly suitable acids are the $C_1$ to $C_4$ monocarboxylic aliphatic acids, i.e. formic acid, acetic acid, propionic acid or a butyric acid.

If one used an acid or an anhydride reaction should take place with the active magnesium oxide or magnesium hydroxide to form the magnesium salt.

Instead of using an acid or anhydride one may use an ammonium, an amine salt, or a Group I or II metal salt of the acid. It is preferred to use salts of $C_1$ to $C_4$ monocarboxylic acids, especially salts of formic or acetic acid. One may use for example ethylamine acetate, diethylamine formate or sodium, potassium, magnesium or calcium salts of for example formic or acetic acids but usually it is preferred to use an ammonium salt. particularly preferred salts are ammonium formate, ammonium acetate and magnesium formate.

Component (f) is a diluent oil. The minimum amount of diluent oil needed will depend upon the nature of the reactants but we find that at least 10% by weight of diluent oil should be used, preferably 20 to 35% by weight. Usually components (a) and (b) e.g. the alkyl phenol sulphide and organic sulphonate are available as a relatively concentrated oil solution of the chemical compound. In such cases it may be found that there is sufficient oil present to make unnecessary the addition of further hydrocarbon solvent or diluent oil.

Suitable diluent oils include hydrocarbon oils, particularly those of mineral origin. Oils having viscosities of 15 to 30 cS at 100° F are very suitable. Alternatively one can use a lubricating oil and examples of such are described later in the specification.

Although aliphatic hydrocarbon solvents such as n-hexane, n-heptane, white spirit, naphtha, or isoparaffins are quite suitable, as component (g) if used, it is preferred to use an aromatic hydrocarbon solvent. Examples of such are toluene, xylene and ethyl benzene.

The relative quantities of the various components (with preferred quantities) are as follows:

| | Component | Wt.% | Preferred Wt.% | Most preferred Wt.% |
|---|---|---|---|---|
| (a) | (excluding any oil that is present) | 15 – 40 | 15 – 30 | 20 – 25 |
| (b) | " | 5 – 15 | | 8 – 10 |
| (c) | | 5 – 15 | 18 – 12 | 9 – 11 |
| (d) | | 2 – 15 | 4 – 10 | 6 – 9 |
| (e) | | At least 0.1 | 0.5 – 2.0 | 1.0 – 1.5 |
| (f) | | At least 10 | 20 – 35 | 23 – 28 |
| (g) | | 10 – 35 | | 15 – 30 |

When component (a) is a hydrocarbyl substituted phenol plus sulphur the range 15–40 wt.% is the total weight of substituted phenol and sulphur. In order to achieve a reasonably high TBN e.g. above 180 it is desirable that the ratio of equivalents of (a) to (b) be between 1:1 and 4:1.

The amount of water which may be present in the reaction mixture is not too critical but in order to achieve a reasonably high TBN it is preferable that the amount of water be less than 50 wt.% compared with the weight of component (d).

In order to carry out the process it is usual for components (a) to (g) to be charged to the reactor, no particular order of addition being necessary. It is usual to reflux the reaction mixture for a period of time, e.g. about 1 hour. Carbon dioxide is then introduced into the reactor, usually until no more reacts. This can take from 10 to 14 hours, e.g. about 12 hours. Whilst carbonation takes place the reaction mixture should preferably be maintained at a temperature of less than 100° C, a preferred temperature being 50°–70° C.

After the reaction has been completed, the hydrocarbon solvent (if used) and alcohol are removed and the product filtered.

The product prepared by this reaction usually has a total base number (Castrol (TBN) of about 200 to 250, e.g. about 225. This overbased magnesium detergent usually comprises a colloidal suspension in oil of magnesium carbonate together with magnesium sulphurised phenate or magnesium phenate and magnesium sulphonate or magnesium alkyl sulphate as dispersant.

The overbased magnesium detergents of this invention are very suitable for use in lubricating oils. The lubricating oil can be any animal, vegetable or mineral oil, for example petroleum oil to SAE 30, 40 or 50 lubricating oil grades, castor oil, fish oils or oxidised mineral oil.

Alternatively, the lubricating oil can be a synthetic ester lubricating oil and these include diesters such as di-octyl adipate, di-octyl sebacate, didecyl azelate, tridecyl adipate, didecyl succinate, didecyl glutarate and mixtures thereof. Alternatively the synthetic ester can be a polyester such as that prepared by reacting polyhydric alcohols such as trimethylolpropane and pentaerythritol with monocarboxylic acids such as butyric acid to give the corresponding tri- and tetra- esters. Also complex esters may be used, such as those formed by esterification reactions between a carboxylic acid, a glycol and an alcohol or a monocarboxylic acid.

The quantity of overbased magnesium detergent added to the lubricating oil should be a minor proportion, e.g. between 0.01% and 10%, by weight, preferably between 0.1% and 5% by weight. These quantities refer to the active ingredient i.e. excluding any oil already present in the overbased detergent. Such lubricating oil compositons may usefully include other additives in minor proportion such as viscosity index improvers (e.g. ethylene-propylene copolymers), dispersants (e.g. the reaction product of polyisobutenyl succinic anhydride with tetraethylene pentamine) and antioxidants (e.g. zinc dialkyl dithiophosphate).

EXAMPLE 1

A reactor was charged with the following reactants

|  | g | wt.% |
|---|---|---|
| An oil solution containing 52.5 wt.% of nonyl phenol sulphide, 17.5 wt% of dinonyl phenol sulphide and 30 wt% oil | 168 | 30.40 |
| 70% wt.% in solution of alkyl benzene sulphonic acid | 70 | 12.66 |
| toluene | 160 | 28.94 |
| methanol | 54 | 9.77 |
| active magnesium oxide (MAGLITE D) | 34 | 6.15 |
| ammonium formate | 6.8 | 1.23 |
| diluent oil (Coray 1531) | 60 | 10.85 |

Reflux of the reactants was then carried out for about 1 hour, followed by blowing in of carbon dioxide for 12 hours, under reflux. Solvent was then removed by distillation and the product filtered.

The product obtained had a TBN (Castrol) of 223.8 mg KOH/g.

EXAMPLE 2

Reactions were carried out similar to that of Example 1 using different promoters. The filtration rates and the basicity were measured in each case giving the following results:

| Promoter MgO (wt% on MgO) | Filtration rate Liters/hr./meter$^2$ | TBN (Castrol) mg KOH/g |
|---|---|---|
| Ammonium acetate (20) | 102 | 224 |
| Mg formate .2H$_2$O (26.2)$^{(1)}$ | 114 | 242 |
| Ammonium acetate (24.4)$^{(2)}$ | 143 | 242 |

$^{(1)}$Equivalent to 20 wt% anhydrous Mg formate on MgO
$^{(2)}$Equivalent on a molar basis to 20% ammonium formate on MgO

EXAMPLE 3

The procedure of Example 1 was repeated using different equivalent ratios of mono nonyl phenol sulphide to alkyl benzene sulphonic acid. The results obtained were as follows:

| Equivalents of: | | | Filtration rate Liters/hr/meter$^2$ | TBN (Castrol) mg KOH/g | | |
|---|---|---|---|---|---|---|
| Mono nonyl phenol sulphide | alkyl benzene sulphonic acid | MgO | | Obtained | Max$^m$ possible | % of Max$^m$ |
| 0.375 | 0.100 | 1.53 | 94 | 225 | 229 | 98 |
| 0.375 | 0.100 | 1.53 | 90 | 187 | 229 | 82 |
| 0.219 | 0.200 | 1.53 | 82 | 198 | 212 | 93 |

EXAMPLE 4

For the sake of comparison Example 1 was repeated omitting the ammonium formate and using Calcined Magnecite (a low activity Magnesium oxide) in place of the MAGLITE D. The product obtained had a TBN (Castrol) of 87 mg KOH/g.

EXAMPLE 5

The process of Example 4 was repeated but including 6.8 grams of ammonium formate. The product obtained had a TBN (Castrol) of 151 mg KOH/g.

EXAMPLE 6

The process of Example 1 was repeated using an active Magnesium oxide prepared by heating basic magnesium carbonate at 600° C for 3 hours. The ammonium formate was omitted and the TBN (Castrol) of the product obtained was 143 mg KOH/g.

EXAMPLE 7

The process of Example 6 was repeated including 6.8 grams of ammonium formate and the TBN (Castrol) of the product was 214 mg KOH/g.

We claim:

1. A process for preparing an overbased magnesium detergent having a total base number of about 200 to 250, which is useful in lubricating oil, said process comprising blowing carbon dioxide into a refluxing reaction mixture until reaction substantially ceases, said reaction mixture comprising:

a. 15 to 40 wt. % of a member selected from the group consisting of: sulphurised $C_8$–$C_{60}$ hydrocarbyl substituted phenol, $C_6$–$C_{60}$ hydrocarbyl substituted thiophenol, and $C_6$–$C_{60}$ hydrocarbyl substituted phenol or thiophenol mixed with a sufficient amount of elemental sulfur to sulfurize said phenol or thiophenol;

b. 5–15 wt. % of a member selected from the group consisting of: alkaryl sulphonic acid having a molecular weight of about 300 to 700; alkali metal and alkaline earth metal salts of said sulphonic acid, and alkali metal and alkaline earth metal sulfate salts of the reaction product of sulphuric acid with a member selected from the group consisting of: cracked wax of 20 to 30 carbon atoms, $C_8$ to $C_{25}$ olefin, and $C_8$ to $C_{25}$ alcohol;

c. 5–15 wt. % of an alcoholic material selected from the group consisting of: ethylene glycol, diethylene glycol, $C_1$ to $C_5$ monohydric alkanol, and $C_2$ to $C_6$ alkoxy alkanol;

d. 2-15 wt. % of active magnesium oxide having a surface area of at least 80 square meters/gm;

e. at least 0.1 wt. % of a member selected from the group consisting of: $C_1$ to $C_{18}$ aliphatic or aromatic, saturated or unsaturated, mono or polycarboxylic acid; anhydrides thereof; and ammonium and Group I and Group II metal salts of said $C_1$ to $C_{18}$ carboxylic acids; and f. at least 10 wt. % of a diluent oil.

2. A process according to claim 1, wherein said reaction mixture comprises 15 to 30 wt. % of component (a); 8 to 12 wt. % of component (c); 2 to 5 wt. % of component (d); and 0.5 to 2.0 wt. % of component (e); and wherein said (c) component consists essentially of said $C_1$ to $C_5$ monohydric alkanol.

3. A process according to claim 2, wherein said reaction mixture comprises 20 to 35 wt. % of component (f); and also includes (g) 10 to 35 wt. % of an aromatic or aliphatic hydrocarbon solvent; and wherein said component (c) consists essentially of methanol.

4. A process according to claim 1, wherein said component (a) is a sulphurised phenol of the structure

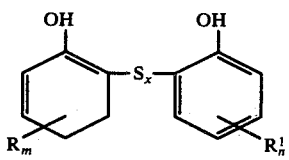

where R and $R^1$ are hydrocarbyl groups, $m$ and $n$ are zero or integers of 1 to 4 provided $m$ and $n$ are not both zero, and $x$ is 1,2,3 or 4; and said component (c) consists essentially of said $C_1$ to $C_5$ monohydric alkanol.

5. A process according to claim 4, wherein said hydrocarbyl substituent is a $C_9$ to $C_{15}$ alkyl group.

6. A process according to claim 5, wherein said component (c) is methanol; wherein said component (d) is magnesium oxide having a surface area of 100–120 sq. meters/gm; and wherein said component (e) is said ammonium or magnesium salt of $C_1$ to $C_4$ monocarboxylic acid.

7. An overbased magnesium detergent prepared by the process according to claim 2.

8. A lubricating oil composition containing between 0.01% and 10% by weight of the overbased magnesium detergent of claim 7.

9. A process for preparing an overbased magnesium detergent, having a total base number of about 200 to 250, which is useful in lubricating oil, said process comprising blowing carbon dioxide into a refluxing reaction mixture until reaction substantially ceases, said reaction mixture comprising:

a. 15 to 40 wt. % of sulphurised $C_8$-$C_{20}$ hydrocarbon substituted phenol;

b. 5-15 wt. % of an alkaryl sulphonic acid, having a molecular weight of about 300 to 700;

c. 5-15 wt. % of alcoholic material selected from the group consisting of: methanol, ethylene glycol, and $C_2$ to $C_6$ alkoxy alkanol;

d. 2-15 wt. % of active magnesium oxide having a surface area of at least 80 square meters/gm;

e. at least 0.1 wt. % of a member selected from the group consisting of: $C_1$ to $C_4$ aliphatic, saturated, monocarboxylic acid; anhydrides thereof; and ammonium and magnesium salts of said acid; and f. at least 10 wt. % of a diluent oil.

10. A process according to claim 9, wherein said reaction mixture comprises 15 to 30 wt. % of component (a); 8 to 12 wt. % of component (c); 2 to 5 wt. % of component (d); and 0.5 to 2.0 wt. % of component (e).

11. A process according to claim 9, wherein said reaction mixture comprises 20 to 35 wt. % of component (f); and also includes (g) 10 to 35 wt. % of an aromatic or aliphatic hydrocarbon solvent.

12. A process according to claim 9, wherein said component (a) is a sulphurised phenol of the structure

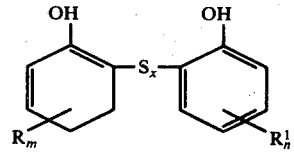

where R and $R^1$ are hydrocarbyl groups, $m$ and $n$ are zero or integers of 1 to 4 provided $m$ and $n$ are not both zero, and $x$ is 1,2,3 or 4.

13. A process according to claim 12, wherein said hydrocarbyl substituent is a $C_9$ to $C_{15}$ alkyl group.

14. A process according to claim 13, wherein said component (c) is said methanol; wherein said component (d) is magnesium oxide having a surface area of 100–120 sq. meters/gm; and wherein said component (e) is said ammonium or magnesium salt of $C_1$ to $C_4$ monocarboxylic acid.

15. An overbased magnesium detergent prepared by the process of claim 9.

16. A lubricating oil composition containing about 0.1 to 5 wt. % of the overbased magnesium detergent of claim 15.

* * * * *